(12) United States Patent
Shen

(10) Patent No.: US 6,577,078 B2
(45) Date of Patent: Jun. 10, 2003

(54) ELECTRONIC BALLAST WITH LAMP RUN-UP CURRENT REGULATION

(75) Inventor: Eric Shen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/965,064

(22) Filed: Sep. 26, 2001

(65) Prior Publication Data

US 2003/0062846 A1 Apr. 3, 2003

(51) Int. Cl.[7] .............................................. H05B 37/02
(52) U.S. Cl. .................... 315/307; 315/224; 315/DIG. 7
(58) Field of Search ............................ 315/209 R, 224, 315/244, 307, 308, DIG. 7, 291, 289

(56) References Cited

U.S. PATENT DOCUMENTS

| | | | | |
|---|---|---|---|---|
| 4,240,009 A | * | 12/1980 | Paul | 315/224 |
| 5,448,139 A | * | 9/1995 | Luursema et al. | 315/308 |
| 5,677,602 A | * | 10/1997 | Paul et al. | 315/224 |
| 5,925,990 A | * | 7/1999 | Crouse et al. | 315/307 |
| 6,049,179 A | * | 4/2000 | Kisaichi et al. | 315/307 |
| 6,181,076 B1 | * | 1/2001 | Trestman et al. | 315/224 |

FOREIGN PATENT DOCUMENTS

EP    0 984 670 A2  *  8/2000

* cited by examiner

Primary Examiner—Don Wong
Assistant Examiner—Ephrem Alemu

(57) ABSTRACT

An electronic ballast with lamp run-up current regulation. In one aspect, the electronic ballast comprises an input stage coupled to an AC source, the input stage converting an AC voltage to a direct current bus voltage, an output stage having inputs coupled to the bus voltage and outputs connected to a lamp, the output stage providing (i) power to the lamp so as to produce a lamp voltage and lamp current in a steady state mode of operation, and (ii) a lamp run-up current to the lamp during a run-up phase of the operation of the lamp, and a current regulation circuit for regulating the lamp run-up current so that the lamp run-up current exceeds a steady state lamp current value, and increases if either the bus voltage increases or the lamp voltage decreases. The output circuit comprises a main high-frequency switching inductor through which an inductor current flows wherein the lamp current is based upon the inductor current. In one embodiment, the current regulating circuitry further includes current limiting circuitry for limiting the lamp run-up-current to a predetermined value. In another embodiment, the current regulating circuitry further comprises a feedback circuit that adjusts the magnitude of the lamp run-up-current in accordance with the magnitude of the bus voltage. In a further embodiment, the current regulating circuit further comprises circuitry for limiting the magnitude of the inductor current at the moment of commutation.

12 Claims, 6 Drawing Sheets

ELECTRONIC BALLAST WITH LAMP RUN-UP CURRENT REGULATION

BACKGROUND OF THE INVENTION

1. Field of the Invention

The present invention relates to an electronic ballast for gas discharge lamps that provides for regulation of lamp run-up current.

2. Description of the Related Art

Typically, immediately after ignition, arc discharge lamps, such as HID lamps, go through a run-up phase where the lamp heats up and the pressure in the discharge builds. At the beginning of run-up the lamp voltage is typically low (20V). It is usually desirable to provide a current to the lamp during run-up that is greater than the steady state current in order to properly heat the electrodes and to build pressure in the lamp more quickly. As the lamp progresses through run-up, the lamp voltage will eventually reach its steady state value (e.g. 90V) and the circuit should be delivering the proper steady state current.

In the present state of the art, regardless of the circuit topology used to drive the lamps, a means of properly controlling the run-up current is required. This typically requires a means of sensing the lamp current and the lamp voltage with suitable controls to regulate the run-up current in response to the lamp conditions. Sensing the lamp current and voltage can contribute to losses in the circuit.

Thus, what is also needed is a method and corresponding circuit that effects control of the run-up current properly in HID lamps without requiring sensing the lamp current or lamp voltage.

SUMMARY OF THE INVENTION

The present invention is directed to an electronic ballast with lamp run-up current regulation. In one aspect, the electronic ballast comprises an input stage coupled to an AC source, the input stage converting an AC voltage to a direct current bus voltage, an output stage having inputs coupled to the bus voltage and outputs connected to a lamp, the output stage providing (i) power to the lamp so as to produce a lamp voltage and lamp current in a steady state mode of operation, and (ii) a lamp run-up current to the lamp during a run-up phase of the operation of the lamp, and a current regulation circuit for regulating the lamp run-up current so that the lamp run-up current exceeds a steady state lamp current value, and increases if either the bus voltage increases or the lamp voltage decreases. The output circuit comprises a main high-frequency switching inductor through which an inductor current flows wherein the lamp current is based upon the inductor current. In one embodiment, the current regulating circuitry further includes current limiting circuitry for limiting the lamp run-up-current to a predetermined value. In another embodiment, the current regulating circuitry further comprises a feedback circuit that adjusts the magnitude of the lamp run-up-current in accordance with the magnitude of the bus voltage. In a further embodiment, the current regulating circuit further comprises circuitry for limiting the magnitude of the inductor current at the moment of commutation.

In a related aspect, the present invention is directed to a method for operating an electronic ballast comprising the steps of (a) providing an electronic ballast comprising an input stage coupled to an AC voltage source and including circuitry for converting an AC voltage to a direct current bus voltage, an output stage having inputs coupled to the bus voltage and outputs connected to a lamp wherein the output stage provides power to the lamp so as to produce a lamp voltage and lamp current, and a current regulation circuit for regulating the lamp run-up current, the electronic ballast having an ignition mode of operation, a post-ignition mode of operation immediately subsequent to the ignition mode of operation wherein the ballast provides a run-up current to the lamp, and a steady state mode of operation, (b) initiating the ignition mode of operation of the electronic ballast, (c) thereafter, initiating the post-ignition mode of operation, and (d) thereafter regulating the lamp run-up current so that the lamp run-up current exceeds a steady state lamp current value, and so that the lamp run-up current increases if either the bus voltage increases or the lamp voltage decreases.

In one embodiment, the method includes the step of limiting circuitry for limiting the lamp run-up-current to a predetermined value.

In another embodiment, the method includes the step of adjusting the magnitude of the lamp run-up-current in accordance with the magnitude of the bus voltage.

In a further embodiment, the method includes the step of limiting the magnitude of the inductor current at the moment of commutation.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DETAILED DESCRIPTION OF THE PREFERRED EMBODIMENTS

Figure 1:
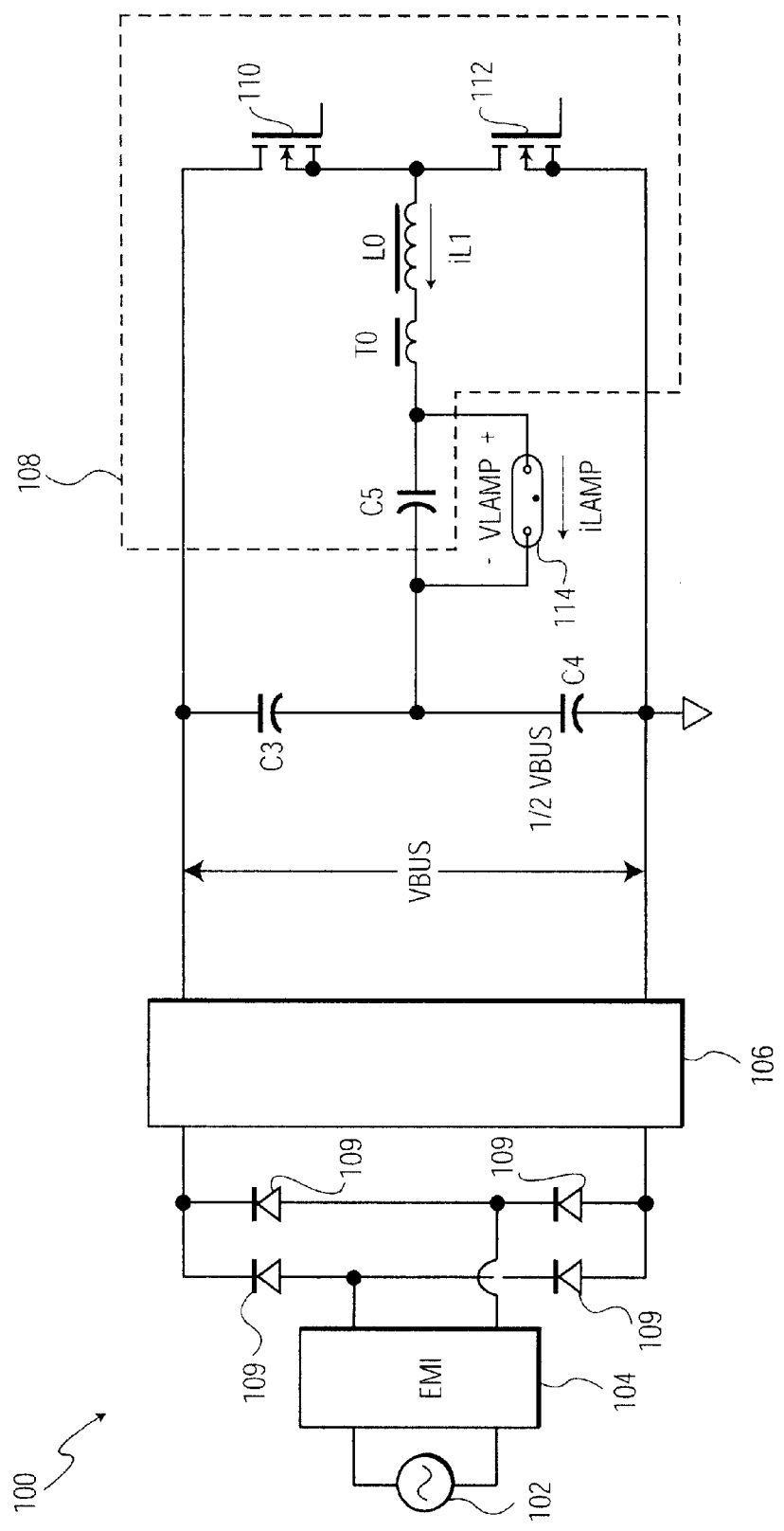
FIG. 1 is a schematic diagram of an electronic ballast with lamp run-up current regulation in accordance with one embodiment of the present invention.

Referring now to the drawings, in which like reference numerals and labels identify similar or identical elements throughout the several views, the electronic ballast 100 of the present invention is shown in detail in FIG. 1. Electronic ballast 100 generally comprises AC power source 102, an electromagnetic interference (EMI) filter 104, and pre-regulator 106, and output or driver stage 108. AC power source 102 provides a low frequency (60 Hz) sinusoidal voltage. Electronic ballast 100 further includes capacitors C3 and C4 which are main energy storage capacitors across to which bus voltage Vbus is applied. Ballast 100 includes input diodes 109.

Output stage 108 includes a half bridge formed by MOSFETs 110 and 112, inductor L1 and transformer T1. Inductor L1 is the main high frequency switching inductor through which inductor current iL1 flows. Transformer T1 is a relatively small saturable transformer that is used to sense the zero crossings of current iL1. Transformer T1 provides a high pulse whenever the current through it reaches zero. Capacitor C5, which is in parallel to lamp 114, is a filter capacitor.

Figure 2:
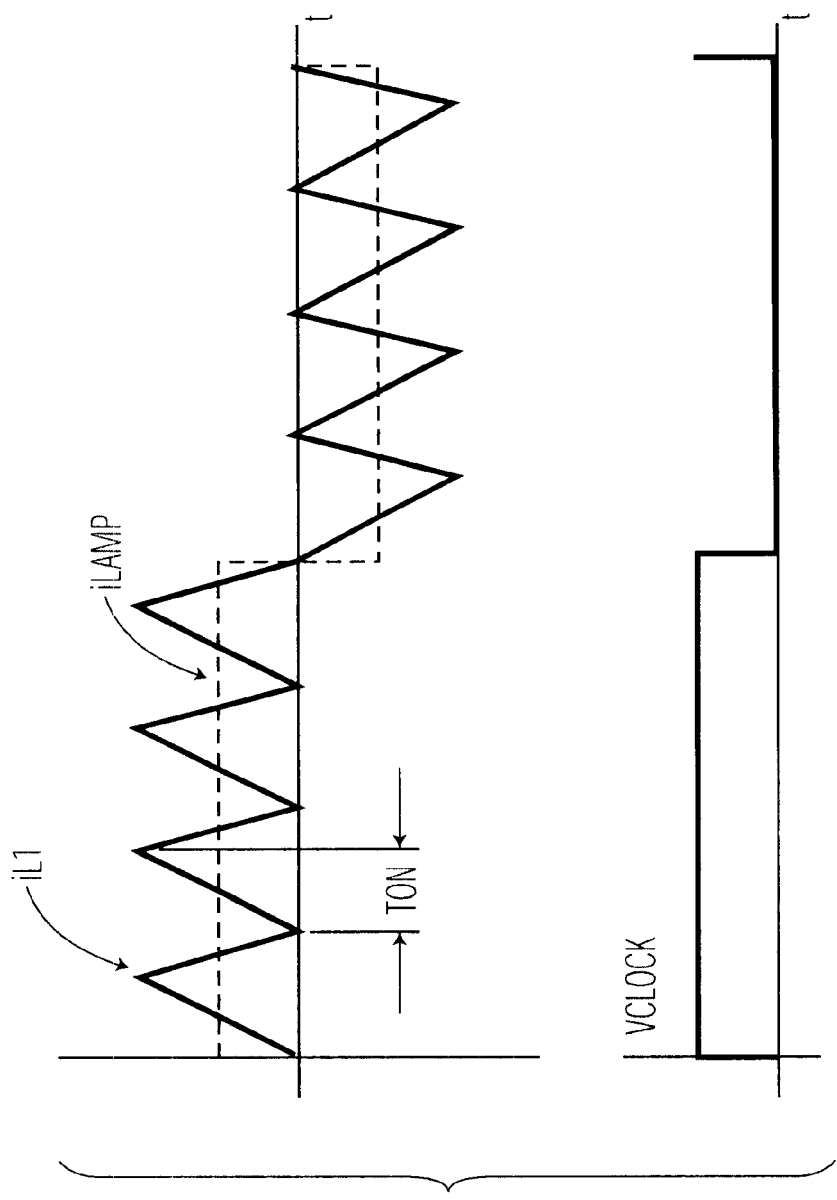
FIG. 2 is a waveform diagram corresponding to the electronic ballast of FIG. 1.

In accordance with this embodiment of the invention, electronic ballast 100 is operated under constant on-time control and in critical discontinuous conduction mode ("CDCM"). When positive current is delivered to lamp 114, MOSFET 110 functions as a charging switch and MOSFET 112 functions as a discharging switch. In CDCM operation, the current iL1 flowing in inductor L1 starts each high frequency switching cycle at zero. MOSFET 110 is turned on for a constant on-time $t_{ON}$, which causes current iL1 to linearly ramp positive. After the on-time is reached, MOSFET 110 is opened (turned off) and MOSFET 112 is closed (turned on). This causes inductor current iL1 to linearly ramp negative back to zero. When the current iL1 reaches zero, as detected by transformer T1, the switching cycle repeats. When negative current is delivered to lamp 114, the roles of MOSFETS 110 and 112 reverse and the current polarity in inductor L1 is negative. In one embodiment, a low frequency clock signal Vclock (see FIG. 2) is used to determine when the roles of MOSFETS 110 and 112 reverse, thus controlling the commutation of the load (i.e. lamp 114). FIG. 2 shows a waveform of inductor current iL1 and the current flowing through lamp 114 (i.e. iLamp) as a function of time, and a corresponding waveform illustrating the clock signal Vclock as a function of time. The peak of inductor current iL1 can be determined from the Equation (1):

$$iL_{1peak} = \frac{1}{L_1}\left(\frac{1}{2}V_{bus} - V_{lamp}\right)t_{on} \quad (1)$$

The peak inductor current $iL_{1peak}$ in inductor L1 is directly proportional to the on-time $t_{on}$. It is also a function of the bus voltage Vbus and the lamp voltage. Since electronic ballast 100 is operated in CDCM, the average current in inductor L1, which is the current delivered to the lamp 114, is exactly one half of the peak current.

For the purposes of explaining this embodiment of the invention, it is assumed that that the bus voltage is controlled to a high value (e.g. 500V) when the lamp power is low, which corresponds to an unlit lamp or a lamp at the beginning of the run-up phase of the operation of the lamp. As the lamp goes through run-up phase and the lamp power increases, the bus voltage decreases. When the lamp nears steady state power levels (e.g. 70 W), the bus voltage is regulated to the steady state value (e.g. 400V).

Equation 1 shows that if the on-time $t_{on}$ is held constant, the peak current $iL_{1peak}$ is a function of the bus voltage and the lamp voltage. If the bus voltage increases, the current iL1 increases. Also if the lamp voltage Vlamp decreases, the current iL1 increases. Both of these conditions are consistent with increasing the run-up current, since at the beginning of run-up phase, the bus voltage is high and the lamp voltage is low. Table I compares the current values at the beginning of run-up phase versus steady state for a constant on-time.

TABLE I

| Condition | Vbus | Vlamp | iL1peak | ilamp |
|---|---|---|---|---|
| Steady state | 400 V | 90 V | 1.60 A | 0.80 A |
| Run-up | 500 V | 20 V | 3.35 A | 1.67 A |

Table I pertains to a 70 W lamp driven nominally at 90V and 0.8 A. When the bus voltage Vbus is 500V and the lamp voltage Vlamp is 20V, the lamp current ilamp is 1.67 A, which is roughly twice the steady state lamp current of 0.8 A. Thus, during the run-up, the lamp current ilamp is doubled while holding the on-time $t_{on}$ constant. The increased lamp current ilamp provides a faster run-up of the lamp 114. As the lamp 114 warms up, the bus voltage Vbus decreases and the lamp voltage Vlamp increases which causes the lamp current ilamp to decrease and eventually settle at the steady state value.

Thus, by operating electronic ballast 100 in CDCM under constant on-time ($t_{on}$) control, the run-up current can be increased by using the load dependent bus voltage regulation scheme disclosed in commonly owned and co-pending U.S. application Ser. No. 09/855,469 filed May 15, 2001 and entitled "HIGH POWER FACTOR ELECTRONIC BALLAST WITH LOAD DEPENDENT BUS VOLTAGE REGULATION", the disclosure of which is herein incorporated by reference. The electronic ballast 100 does not require any sensing of the lamp voltage or current and also does not require additional controls other than the control to implement the bus voltage regulation.

Figure 3:
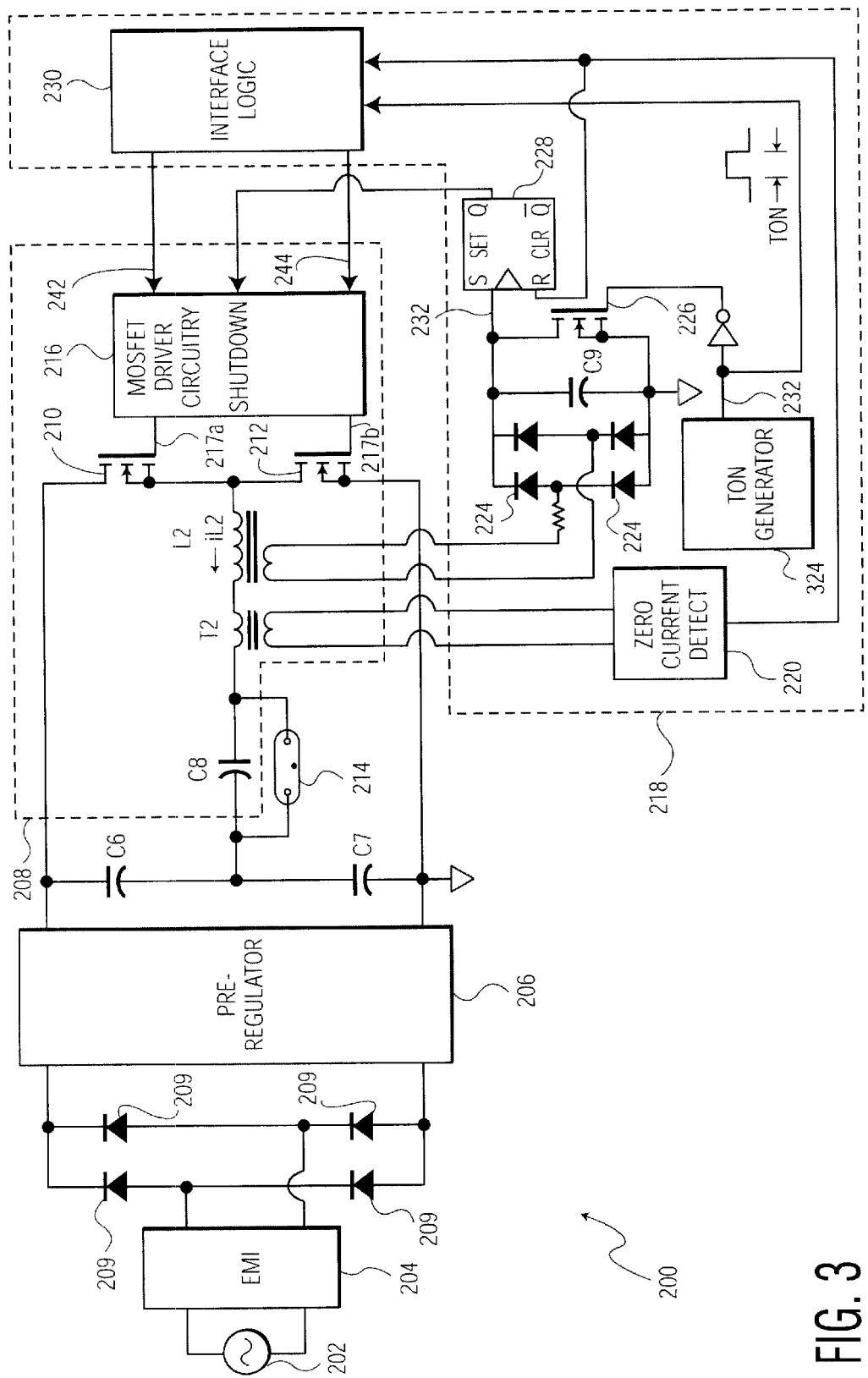
FIG. 3 is a schematic diagram of an electronic ballast with lamp run-up current regulation in accordance with another embodiment of the present invention.

Referring to FIG. 3, there is shown a further embodiment of the present invention which provides a current limiting function that limits the run-up current. Electronic ballast 200 generally comprises AC power source 202, EMI filter 204, and pre-regulator 206, and output or driver stage 208. AC power source 202 provides a low frequency (60 Hz) sinusoidal voltage. Electronic ballast 200 further includes capacitors C6 and C7 which are main energy storage capacitors across to which bus voltage Vbus is applied. Electronic ballast 200 includes input diodes 209.

Output stage 208 includes a half bridge that is formed by MOSFETs 210 and 212. Inductor L2 is the main high frequency switching inductor through which inductor current iL2 flows. Transformer T2 is a relatively small saturable transformer that is used to sense the zero crossings of current iL2. Transformer T2 provides a high pulse whenever the current through it reaches zero. Capacitor C8, which is in parallel to lamp 214, is a filter capacitor. Output stage 208 further includes MOSFET driver circuit 216 which outputs control signals 217a and 217b which turn MOSFETS 210 and 212 on and off, depending upon the levels of signals 217a and 217b.

Electronic ballast 200 further comprises control circuit 218. Control circuit 218 generally comprises zero-current-detection circuit 220, and on-time ($T_{on}$) generator circuit 222. Control circuit further comprises a current limit circuit that comprises resistor R1, diodes 224, capacitor C9, MOSFET 226 and S-R flip flop 228. The Q output of S-R flip flop 228 is connected to a driver shutdown signal input of MOSFET driver circuit 216. Control circuit 218 also includes interface logic circuit 230. Logic circuit 230 includes inputs that are connected to the output of on-time $T_{ON}$ generator circuit 222 and the output of zero current detection circuit 220.

A secondary winding is taken off of the main high frequency inductor L2 and is rectified, via diodes 224, and integrated through resistor R1 and capacitor C9. The resulting voltage across capacitor C9 is proportional to the inductor current iL2. MOSFET 226 functions as a switch which resets the capacitor voltage of capacitor C9 during each switching cycle. The voltage across capacitor C9 is used to indicate when a maximum value of inductor current iL2 is attained. The current limit circuit outputs peak detection signal 232 that is inputted directly into the S (Set) input of S-R flip-flop 228. When the signal level of signal 232 exceeds the logic threshold of the S input of S-R flip-flop 228, the Q output of flip-flop 232 shifts to a particular level that causes MOSFET driver circuit 216 to turn off MOSFETS 210 and 212 thereby preventing any further increase of inductor current iL2.

$T_{ON}$ generator circuit 222 generates a pulse signal 232 which has a specified time duration of $T_{ON}$. Pulse signal 232 is inputted into interface circuit 230 which, in response, generates the signals 242 and 244 for input to MOSFET driver circuit 216. The Ton pulse signal 232 also controls the discharging of the integration capacitor C9 by turning on MOSFET 226 at the appropriate time.

Electronic ballast 200 is preferably used to prevent the run-up current from increasing to a value that is too large relative to the steady state value. For example, Table I shows that the run-up current is approximately 1.67 A, compared to a steady state current of 0.8 A. However, some lamps may require that the run-up current be limited to a maximum value (for example 1.4A). As shown in the foregoing description, the current limit circuit of ballast 200 provides such a current limiting function.

Figure 4:
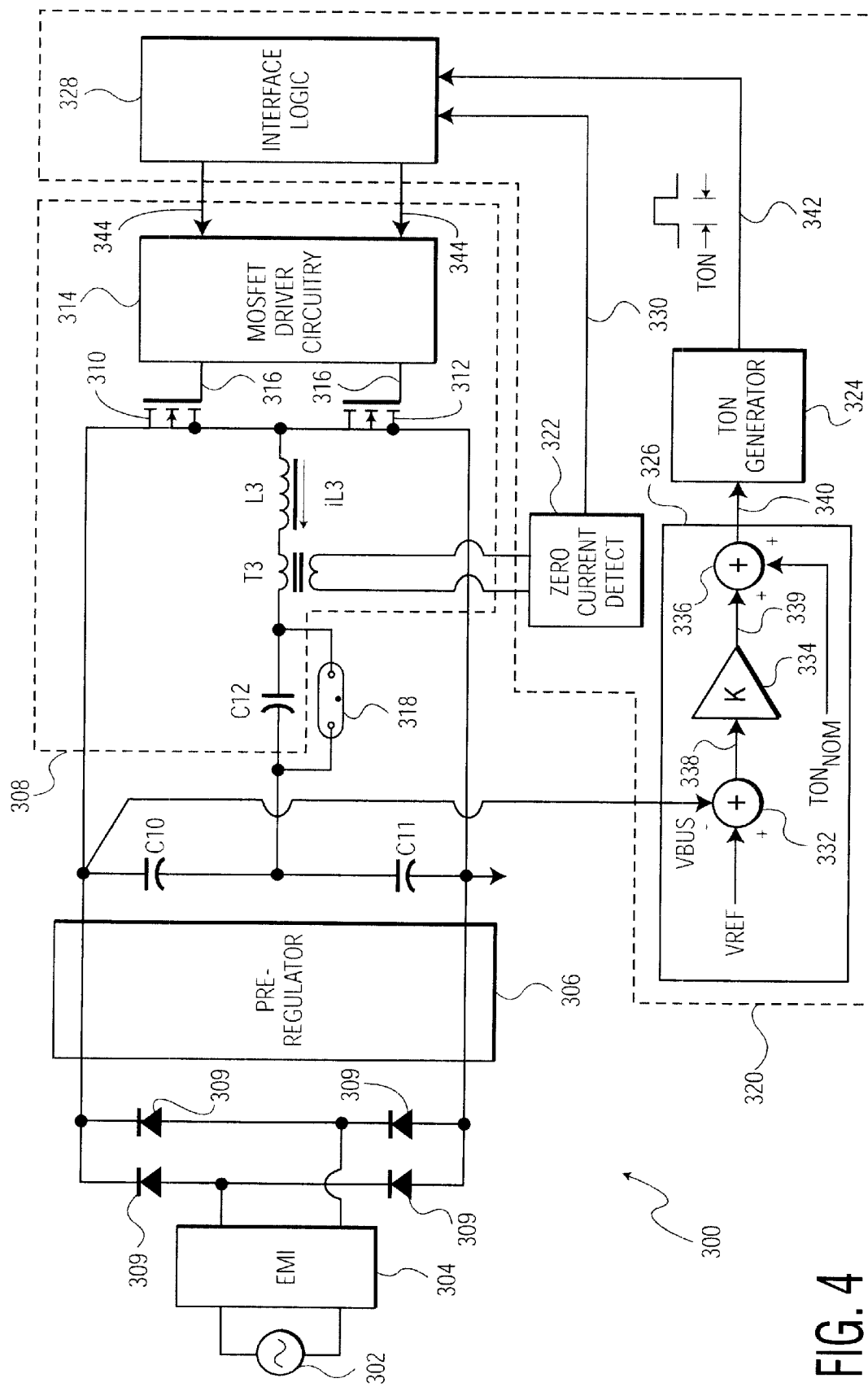
FIG. 4 is a schematic diagram of an electronic ballast with lamp run-up current regulation in accordance with a further embodiment of the present invention.

Referring to FIG. 4, there is shown a further embodiment of the electronic ballast of the present invention. Electronic ballast 300 includes control circuitry that modifies the on-time $T_{ON}$ to increase or decrease the lamp current. The modification of the on-time $T_{ON}$ depends upon the magnitude of the bus voltage. A linear feedback scheme is used to modify on-time $T_{ON}$. The configuration and operation of electronic ballast 300 is described in the ensuing description.

Electronic ballast 300 generally comprises AC power source 302, EMI filter 304, pre-regulator 306, and output or driver stage 308. AC power source 302 provides a low frequency (60 Hz) sinusoidal voltage. Electronic ballast 300 further includes capacitors C10 and C11 which are main energy storage capacitors across to which bus voltage Vbus is applied. Electronic ballast 300 includes input diodes 309.

Output stage 308 includes a half bridge formed by MOSFETs 310 and 312, MOSFET driver circuit 314, inductor L3, and transformer T3. Inductor L3 is the main high frequency switching inductor through which inductor current iL3 flows. Transformer T3 is a relatively small saturable transformer that is used to sense the zero crossings of current iL3. Transformer T3 provides a high pulse whenever the current through it reaches zero. Output stage 308 further includes filter capacitor C12 which is in parallel to lamp 318. MOSFET driver circuit 314 outputs control signals 316 that either turn MOSFETS 310 and 312 on or off, depending upon the level of signals 316.

Electronic ballast 300 further includes control circuit 320. Control circuit 320 generally comprises zero-current-detection circuit 322, on-time ($T_{on}$) generator circuit 324, feedback circuit 326, and interface logic circuit 328. Transformer T3 cooperates with zero-current crossing detection circuit 322 to detect the zero-crossing point of inductor iL3. The output of zero-crossing detection circuit 322 is inputted into interface logic circuit 328. When the inductor current iL3 reaches zero, at the end of each switching cycle, zero-crossing detector circuit 322 outputs signal 330 that has a level that causes MOSFET driver circuit 314 to turn on one of the MOSFETs 310 and 312, and turn off the other MOSFET.

Feedback circuit 326 includes summing network 332 that has inputs for receiving the bus voltage Vbus and a reference voltage Vref. Feedback circuit 326 includes a feedback gain circuit 334 which has a gain K. Feedback circuit 326 also includes summing network 336. Summing network 332 compares the bus voltage Vbus to reference voltage Vref. Summing network 332 outputs signal 338 which is inputted into feedback gain circuit 334. The output of feedback gain circuit 334 outputs error signal 339 that is inputted into summing network 336. Summing network 336 sums error signal 339 to nominal reference on-time signal $T_{ON(NOM)}$. Summing network 336 outputs signal 340 which is an analog voltage level that is proportional to the desired on-time $T_{ON}$. Signal 340 is inputted into $T_{ON}$ generator circuit 324. In response, $T_{ON}$ generator circuit 324 generates a pulse signal 342 having a width that is proportional to the input signal 340. Pulse signal 342 is inputted into interface logic circuit 328 which outputs control signals 344 for input into MOSFET driver circuit 314. In response, MOSFET driver circuit 314 outputs signals 316 that have the desired level for a predetermined time duration that corresponds to the width of the pulse signal 342.

Thus, the difference between the bus voltage Vbus and reference voltage Vref is used to modify the on-time $T_{ON}$. For example, if the bus voltage Vbus is greater than the reference voltage Vref and the feedback gain K is positive, then the on-time $T_{ON}$ is reduced. If the feedback gain K is negative, then the on-time $T_{ON}$ is increased.

Figure 5:
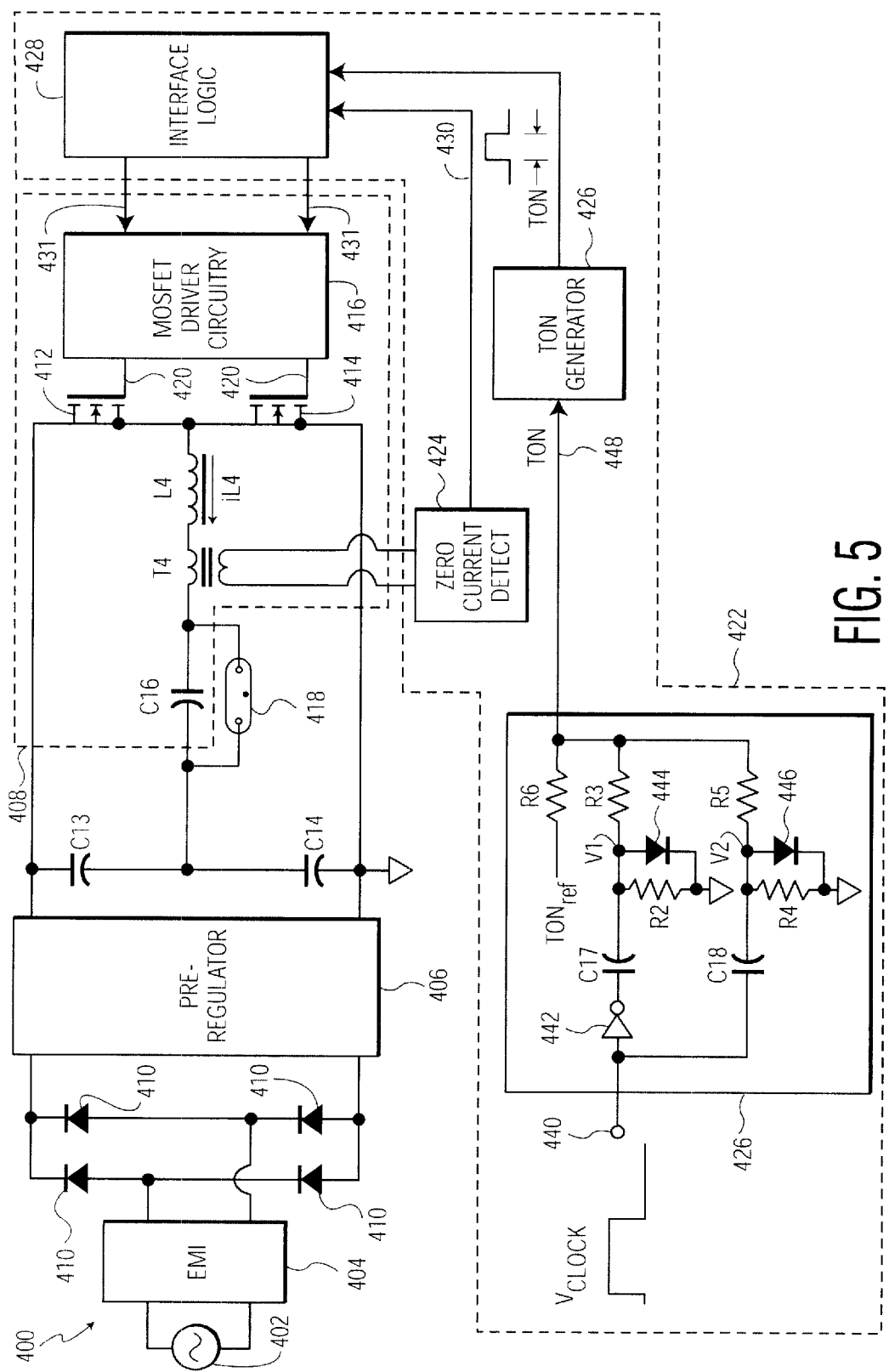
FIG. 5 is a schematic diagram of an electronic ballast with lamp run-up current regulation in accordance with another embodiment of the present invention.

Equation 1 shows that the peak inductor current is described as a function of bus voltage, lamp voltage, and on-time $T_{ON}$. At the moment of commutation, when the inductor current switches polarity, the peak inductor current can increase to large values. This is because the lamp voltage, or the voltage across filter capacitor C5 (see FIG. 1), cannot change instantaneously. For example, Table I shows that during the steady-state case wherein the bus voltage Vbus is 400 volts and the lamp voltage is 90 volts, the nominal peak inductor current is 1.6A. However, at commutation, the lamp voltage is −90 volts which provides a peak inductor current of 4.2A. This relatively high peak current requires a relatively larger inductor, thereby increasing costs and required space in the electronic ballast package. Therefore, FIG. 5 shows another embodiment of the electronic ballast of the present invention which addresses this problem. Electronic ballast 400 controls run-up current at the moment of commutation. Electronic ballast 400 generally comprises AC power source 402, EMI filter 404, pre-regulator 406, and output or driver stage 408. AC power source 402 provides a low frequency (60 Hz) sinusoidal voltage. Electronic ballast 400 further includes capacitors C13 and C14 which are main energy storage capacitors across to which bus voltage Vbus is applied. Electronic ballast 400 includes input diodes 410.

Output stage 408 includes a half bridge formed by MOSFETs 412 and 414, MOSFET driver circuit 416, inductor L4 and transformer T4. Inductor L4 is the main high frequency switching inductor through which inductor current iL4 flows. Transformer T4 is a relatively small saturable transformer that is used to sense the zero crossings of inductor current iL4. Transformer T4 provides a high pulse whenever the current through it reaches zero. Output stage 408 further includes filter capacitor C16 which is in parallel to lamp 418. Output stage 408 further includes MOSFET driver circuit

416. MOSFET driver circuit 416 outputs control signals 420 that either turn MOSFETS 412 and 414 on or off, depending upon the level and duration of signals 420.

Electronic ballast 400 further includes control circuit 422. Control circuit 422 generally comprises zero-current-detection circuit 424, on-time ($T_{on}$) generator circuit 426, open-loop commutation current limit circuit 426, and interface logic circuit 428. Transformer T4 cooperates with zero-current crossing detection circuit 424 to detect the zero-crossing point of inductor current iL4. When the inductor current iL4 reaches zero, at the end of each switching cycle, zero-crossing detector circuit 424 outputs pulse signal 430 for input into interface logic circuit 428. In response, interface logic circuit 428 outputs signals 431 that have a level that causes MOSFET driver circuit 416 to turn on one of the MOSFETS 410 and 412 and turn off the other MOSFET.

Figure 6:
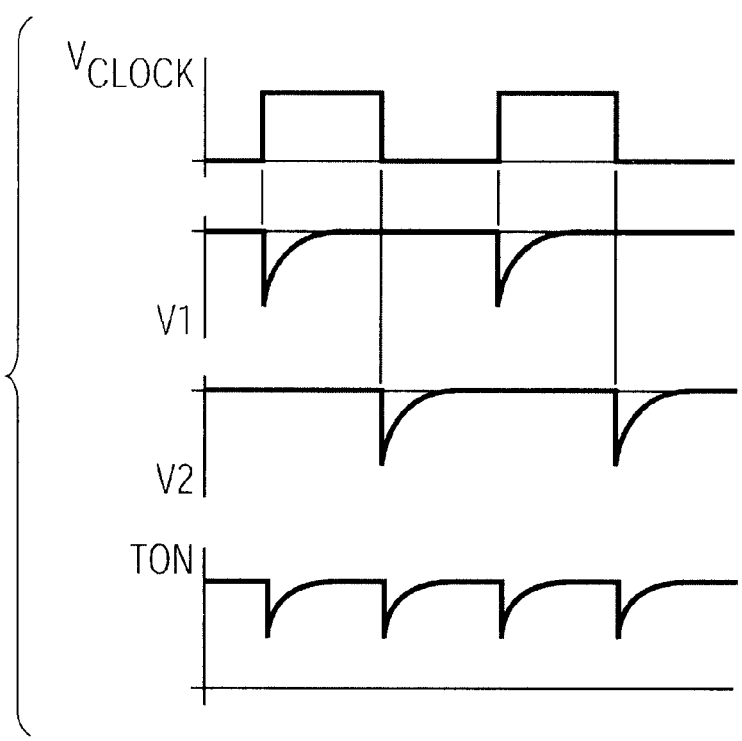
FIG. 6 is a waveform diagram corresponding to the electronic ballast of FIG. 5.

Control circuit 422 includes input 440 for receiving a low frequency commutation clock signal Vclock (also shown in FIG. 6). Control circuit 422 further includes an inverter 442 and a first network comprising capacitor C17, resistor R2, resistor R3 and diode 444 that is in parallel with resistor R2. Capacitor C17 and resistor R2 form an RC (resistor-capacitor) circuit. Control circuit 422 further includes a second network comprising capacitor C18, resistor R4, resistor R5 and diode 446 that is connected in parallel with resistor R4. Capacitor C18 and resistor R4 forms another RC circuit.

The low frequency commutation clock signal Vclock is fed into the network comprising capacitor C18 and resistors R4 and R5. Clock signal Vclock is also inverted via inverter 442 and inputted into the network comprising capacitor C17 and resistors R2 and R3. Diodes 444 and 446 limit positive going signals. The RC circuit comprising capacitor C17 and resistor R2 create an edge-triggered waveform V1. The RC circuit comprising capacitor C18 and resistor R4 create an edge-triggered waveform V2. Both waveforms V1 and V2 are shown in FIG. 6. Waveforms V1 and V2 are summed together with a constant reference value $T_{ON(ref)}$ to produce a resulting voltage $T_{ON}$, indicated by the number 448, which represents the on-time. Resistors R3, R5 and R6 accomplish the aforementioned summing function. The on-time is reduced during commutation and returns to a nominal value after a time constant determined by the aforementioned RC circuits. Thus, control circuit 422 reduces the on-time during commutation in order to limit the peak current iL4.

Thus, electronic ballasts 100, 200, 300 and 400 operate with constant on-time control and in CDCM so as to control run-up current without the need for sensing lamp current and lamp voltage. Electronic ballasts 100, 200, 300 and 400 provide the following advantages and options:

a) the circuitry of ballast 100 responsible for regulation of lamp run-up current can be used with the load-dependent voltage regulation scheme shown in disclosed in commonly owned and co-pending U.S. application Ser. No. 09/855,469, filed May 15, 2001 and entitled "HIGH POWER FACTOR ELECTRONIC BALLAST WITH LOAD DEPENDENT BUS VOLTAGE REGULATION" without any additional controls or modification of the on-time;

b) electronic ballast 200 provides the ability to impose an absolute limit on the run-up current by integrating the inductor voltage;

c) electronic ballast 300 provides additional scaling of the current in response to variations in the bus voltage via a linear feedback scheme which modifies the on-time in response to changes in the bus voltage;

d) electronic ballast 400 limits the peak inductor current during commutation via an open loop configuration that reduces the on-time in response to the commutation clock signal;

e) electronic ballasts 100, 200, 300 and 400 do not require the direct sensing of the lamp current or lamp voltage; and f) electronic ballasts 100, 200, 300 and 400 can be used with many types of arc-discharge lamps, such as HID lamps, fluorescent lamps, etc.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. An electronic ballast, comprising:

an input stage coupled to an AC source, the input stage converting an AC voltage to a direct current bus voltage;

an output stage having inputs coupled to the bus voltage, outputs connected to a lamp, and an inductor in series with the lamp, the output stage operating with substantially constant on-time control providing (i) power to the lamp so as to produce a lamp voltage and lamp current in a steady state mode of operation, and (ii) a lamp run-up current to the lamp during a run-up phase of the operation of the lamp; and a current regulation circuit monitoring the current through said inductor to cause the lamp run-up current to exceed a steady state lamp current value and to increase lamp run-up current if either the bus voltage increases or the lamp voltage decreases.

2. The electronic ballast according to claim 1 wherein the current regulating circuitry further includes current limiting circuitry for limiting the lamp run-up current to a predetermined value.

3. The electronic ballast according to claim 1 wherein the current regulating circuitry further comprises a feedback circuit that adjusts the magnitude of the lamp run-up current in accordance with the magnitude of the bus voltage.

4. The electronic ballast according to claim 3 wherein the feedback circuit includes a circuit for comparing the bus voltage to a predetermined reference voltage.

5. The electronic ballast according to claim 1 wherein the output circuit comprises a main high-frequency switching inductor through which an inductor current flows wherein the lamp current is based upon the inductor current.

6. The electronic ballast according to claim 5 wherein the current regulating circuit further comprises circuitry for limiting the magnitude of the inductor current at the moment of commutation.

7. The electronic ballast according to claim 1 further comprising an energy storage circuit for storing the bus voltage provided by the input circuit.

8. The electronic ballast according to claim 1 further comprising a bus voltage regulating circuitry that adjust the bus voltage in response to variation in the lamp power, the bus voltage regulating circuitry regulating the bus voltage to a constant value under steady state conditions and preventing the bus voltage from increasing in an uncontrolled manner under open circuit and pre-ignition conditions.

9. A method for operating an electronic ballast having an input stage coupled to an AC voltage source and including circuitry for converting an AC voltage to a direct current bus voltage, an output stage having inputs coupled to the bus voltage outputs connected to a lamp, and an inductor in series with the lamp, wherein the output stage provides power to the lamp so as to produce a lamp voltage and lamp current, and a current regulation circuit for regulating the lamp run-up current, the electronic ballast having an ignition mode of operation, a post-ignition mode of operation immediately subsequent to the ignition mode of operation wherein the ballast provides a run-up current to the lamp, and a steady state mode of operation; said method comprising the steps of:

a) initiating the ignition mode of operation of the electronic ballast;

b) thereafter, initiating the post-ignition mode of operation in which the ballast operates with substantially constant on-time control;

c) monitoring the current through the inductor; and d) regulating the lamp run-up current in accordance with the current through the inductor so that the lamp run-up current exceeds a steady state lamp current value, and so that the lamp run-up current increases if either the bus voltage increases or the lamp voltage decreases.

10. The method according to claim 9 further including the step of limiting circuitry for limiting the lamp run-up-current to a predetermined value.

11. The method according to claim 9 further including the step of adjusting the magnitude of the lamp run-up-current in accordance with the magnitude of the bus voltage.

12. The method according to claim 9 further including the step of limiting the magnitude of the inductor current at the moment of commutation.

\* \* \* \* \*